(12) United States Patent
Clark (10) Patent No.: US 8,192,130 B2
(45) Date of Patent: Jun. 5, 2012

(54) SQUARE BALE LOADER AND FEEDER (76) Inventor: Adam Clark, Harrison, MT (US)

( * ) Notice: Subject to any disclaimer, the term of this patent is extended or adjusted under 35 U.S.C. 154(b) by 335 days.

(21) Appl. No.: 12/459,027

(22) Filed: Jun. 25, 2009

(65) Prior Publication Data
US 2010/0008747 A1 Jan. 14, 2010

Related U.S. Application Data (60) Provisional application No. 61/133,046, filed on Jun. 25, 2008.

(51) Int. Cl.
A01D 90/08 (2006.01)
A01D 87/00 (2006.01)
A01D 90/00 (2006.01)

(52) U.S. Cl. .......... 414/25; 414/515; 414/501; 414/111; 56/474; 241/101.76; 241/605

(58) Field of Classification Search ............ 198/406, 198/410, 412; 241/101.71, 101.75, 281, 241/283, 605; 414/111, 24.5, 24.6, 25, 477, 414/482, 491, 503, 514, 680, 778, 780; 56/474, 56/476, 478, 480
See application file for complete search history.

(56) References Cited

U.S. PATENT DOCUMENTS

| 2,726,115 | A | | 12/1955 | Babcock et al. | |
|---|---|---|---|---|---|
| 3,322,256 | A | * | 5/1967 | Roach | 198/410 |
| 3,790,013 | A | | 2/1974 | Smith | |
| 4,101,081 | A | * | 7/1978 | Ritter et al. | 241/101.74 |
| 4,376,607 | A | * | 3/1983 | Gibson | 414/24.6 |
| 5,383,714 | A | | 1/1995 | Hunter | |
| 5,397,208 | A | | 3/1995 | Siebenga | |
| 5,507,612 | A | | 4/1996 | Siebenga | |
| 5,542,803 | A | | 8/1996 | Driggs | |
| 6,048,160 | A | | 4/2000 | Reist et al. | |
| 6,116,838 | A | * | 9/2000 | Whatley et al. | 414/25 |
| 6,171,047 | B1 | * | 1/2001 | Vandervalk | 414/24.5 |
| 6,328,520 | B1 | | 12/2001 | Maclay | |
| 6,695,560 | B2 | | 2/2004 | Maclay | |
| 6,764,274 | B2 | | 7/2004 | Maclay | |
| 2002/0090281 | A1 | | 7/2002 | Siebenga | |
| 2004/0022617 | A1 | | 2/2004 | Gardner et al. | |
| 2008/0213066 | A1 | | 9/2008 | Bootsma et al. | |

OTHER PUBLICATIONS

Specifications of Hydra FLKR by Triple C, available at http://www.kensi90.com/images/Hydra20FLKR20Specs20PDF.pdf as of Mar. 25, 2006, accessed on Dec. 7, 2010.*

* cited by examiner

Primary Examiner — Gregory Adams
(74) Attorney, Agent, or Firm — Richard C. Conover (57) ABSTRACT Apparatus for loading and feeding hay bales including a transport vehicle having a flatbed and a tiltable support frame mounted to the flatbed for carrying a stack of bales. A hoist is used to tilt the support frame from a horizontal hay bale transport position to a vertical position against a bale stack for picking up a bale stack. Squeeze arms are used to secure the bale stack to the support frame. An endless chain on the support frame is used to selectively move the bales forwardly. A flaker is mounted at a forward end of the flatbed for receiving a bale advanced thereon and selectively flaking off portions of the bale. A tipping apparatus is provided for selectively tipping a bale advanced by the endless chain from the support frame onto the flaker.

3 Claims, 13 Drawing Sheets

FIG. 15

SQUARE BALE LOADER AND FEEDER

This application claims the benefit of provisional application Ser. No. 61/133,046 filed Jun. 25, 2008.

BACKGROUND OF INVENTION

The present invention relates to apparatus for loading a stack of square bales onto a truck bed and moving one of the square bales to a square bale flaker whereby the square bale flaker is used, to flake off the bale for feeding purposes.

Ranchers today are storing hay by using large rectangular or square cross section bales. When these large bales are stacked, they are generally stacked in a four bale stack with one bale over the other at a storage location. When it is desired to feed these large square bales, it is difficult to manipulate these bales manually because of their large size and weight. The present invention is directed to apparatus for picking up and loading a stack of bales onto the bed of a truck or trailer. The truck or trailer is then driven to the location where feeding is to occur and the hay bales are flaked to dispose the hay on a side of a truck or trailer so that livestock can eat the hay.

There are known systems for loading, transporting and unloading bales such as shown in U.S. Pat. No. 6,328,520 to Maclay. The present invention has advantages over these types of systems by having a superior system for clasping the lowest bale in the stack of bales to be loaded which allows different sized bales to be easily loaded and secured. Further, the present invention also provides a flaker system for feeding the hay rather than using an exposed sickle bar for unloading the hay which may cause injury.

SUMMARY OF INVENTION

The present invention relates to apparatus for loading a stack of square bales onto a truck bed for transporting to a feeding location and feeding the bales with a flaker used to flake off portions of the bale.

The apparatus includes a transport vehicle having a tiltable support frame, mounted to the truck bed, for carrying a stack of bales. A hoist is used for tilting the support frame from a horizontal position to a vertical position. When the support frame is in the vertical position, the transport vehicle is backed into a stack of bales. The apparatus further includes squeeze arms pivotally mounted to the support frame at the aft end thereof on opposite lateral sides for pivotal movement in a lateral direction and further includes control means for simultaneously moving the squeeze arms in an outward direction and in an opposite inward direction for clasping the lowest bale in the stack. The hoist is then used to tilt the support frame back onto the bed of the transport vehicle. The vehicle may then be moved to a location where feeding is to occur.

The apparatus includes an endless chain which is mounted on the support frame for selectively moving the bales toward the forward end of the support frame. A flaker is mounted to the truck bed at a forward end thereof for flaking off portions of the bale positioned on the flaker in a lateral direction. A tipping apparatus is provided which is mounted to the truck bed for selectively tipping a bale which has been advanced by the endless chain, from the support frame onto the flaker.

BRIEF DESCRIPTION OF THE DRAWINGS

In order that the invention may be clearly understood and readily carried into effect, a preferred embodiment of the invention will now be described, by way of example only, with reference to the accompanying drawings wherein.

DESCRIPTION OF A PREFERRED EMBODIMENT

Figure 1:
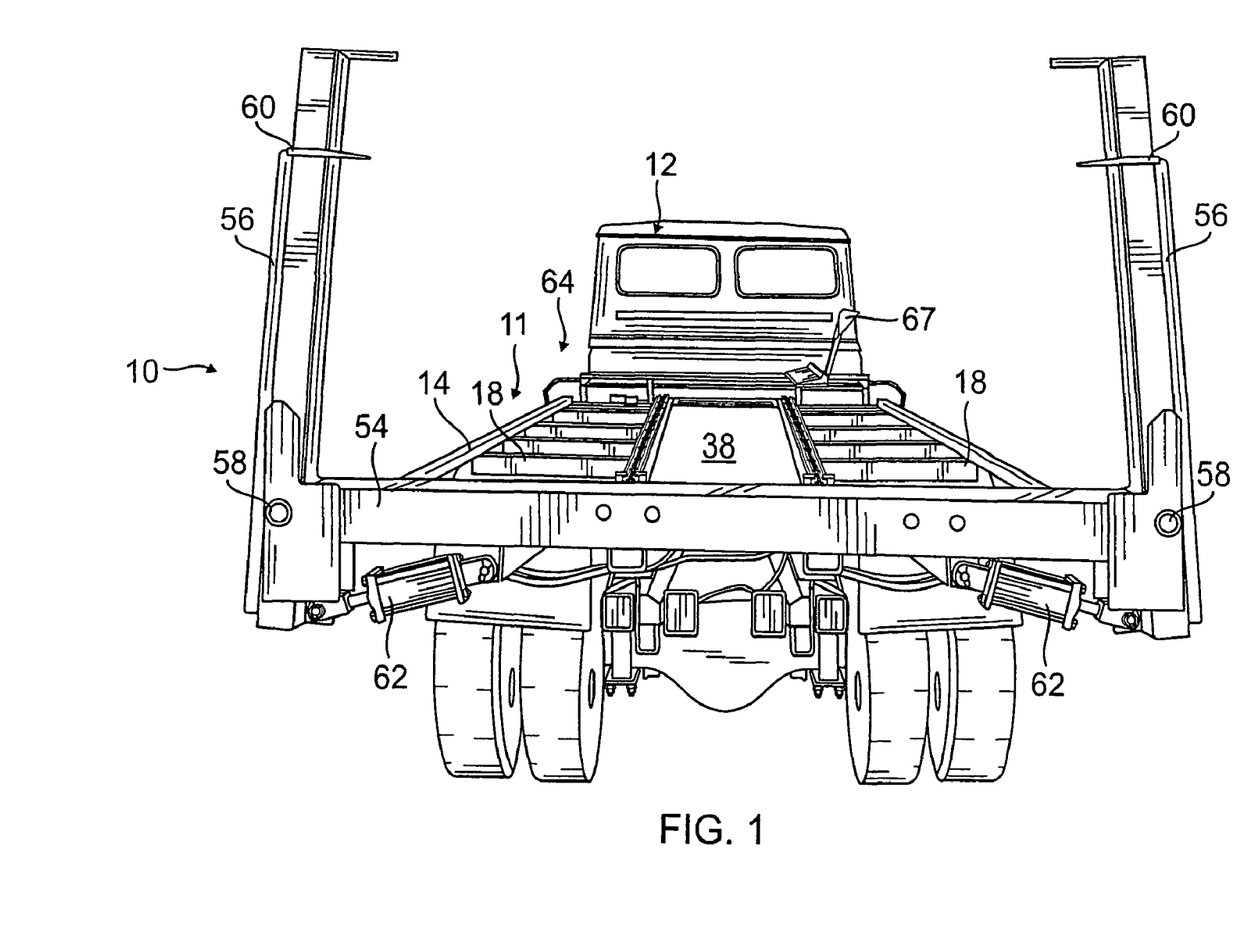
FIG. 1 is an end perspective view of a square bale loader and feeder according to the present invention.
Figure 2:
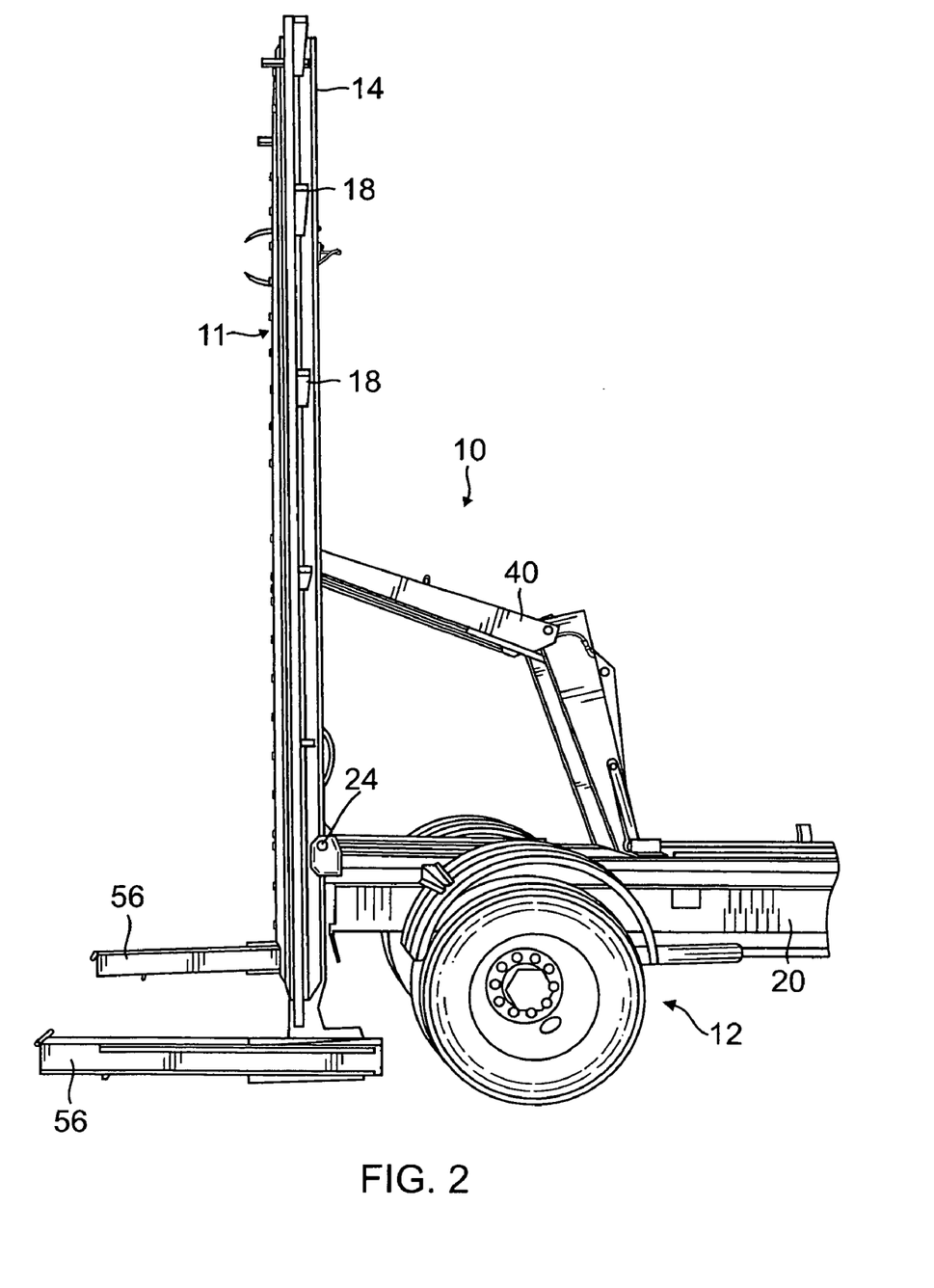
FIG. 2 is a side perspective view of the invention as shown in FIG. 1 with a support frame rotated to an upright position.
Figure 3:
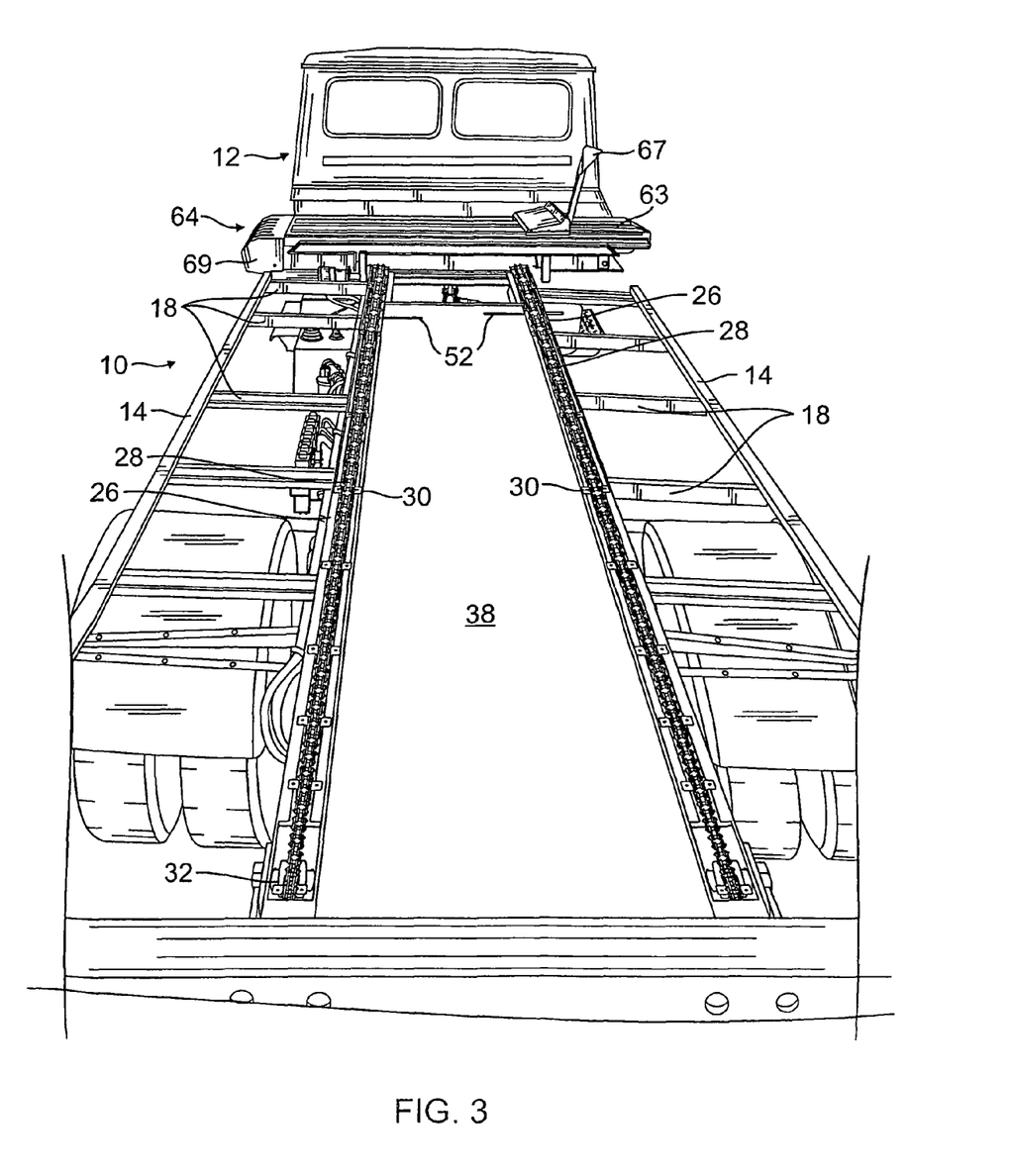
FIG. 3 is a partial top view of the invention shown in FIG. 1.
Figure 4:
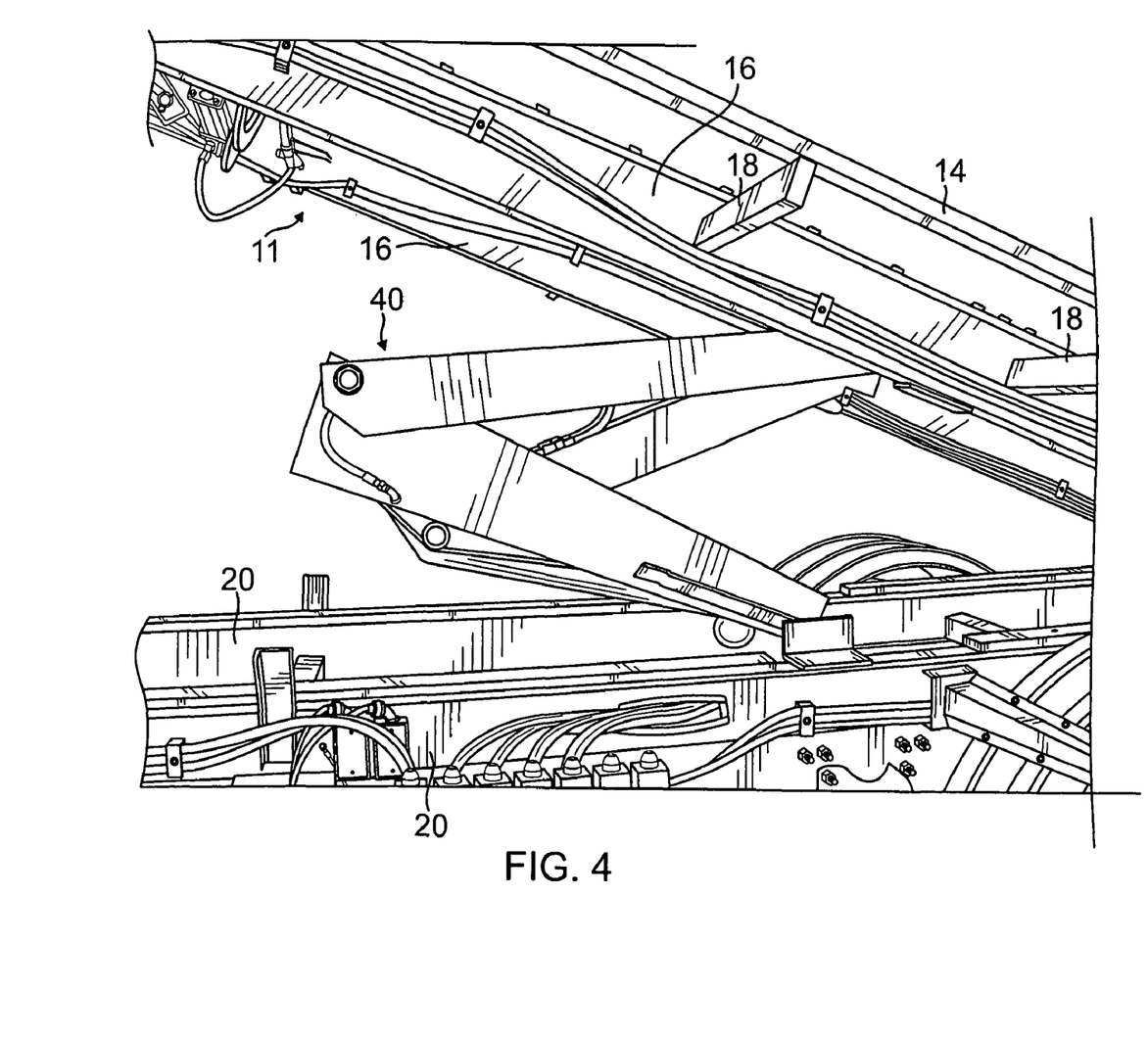
FIG. 4 is a partial detail view showing the lifting of the support frame shown in FIG. 2.

A square bale loader and feeder 10 according to the present invention is shown in FIGS. 1 and 2 mounted on a truck 12. As shown in FIGS. 2 and 3, the square bale loader and feeder 10 includes a support frame 11. The support frame 11 includes a pair of parallel and spaced apart square tube outriggers 14 as shown in FIGS. 1 and 4. A pair of spaced apart and parallel tubular beams 16 are provided in between the outriggers 14 as shown in FIG. 4. The outriggers 14 are secured to the beam 16 with bracing numbers 18.

Figure 5:
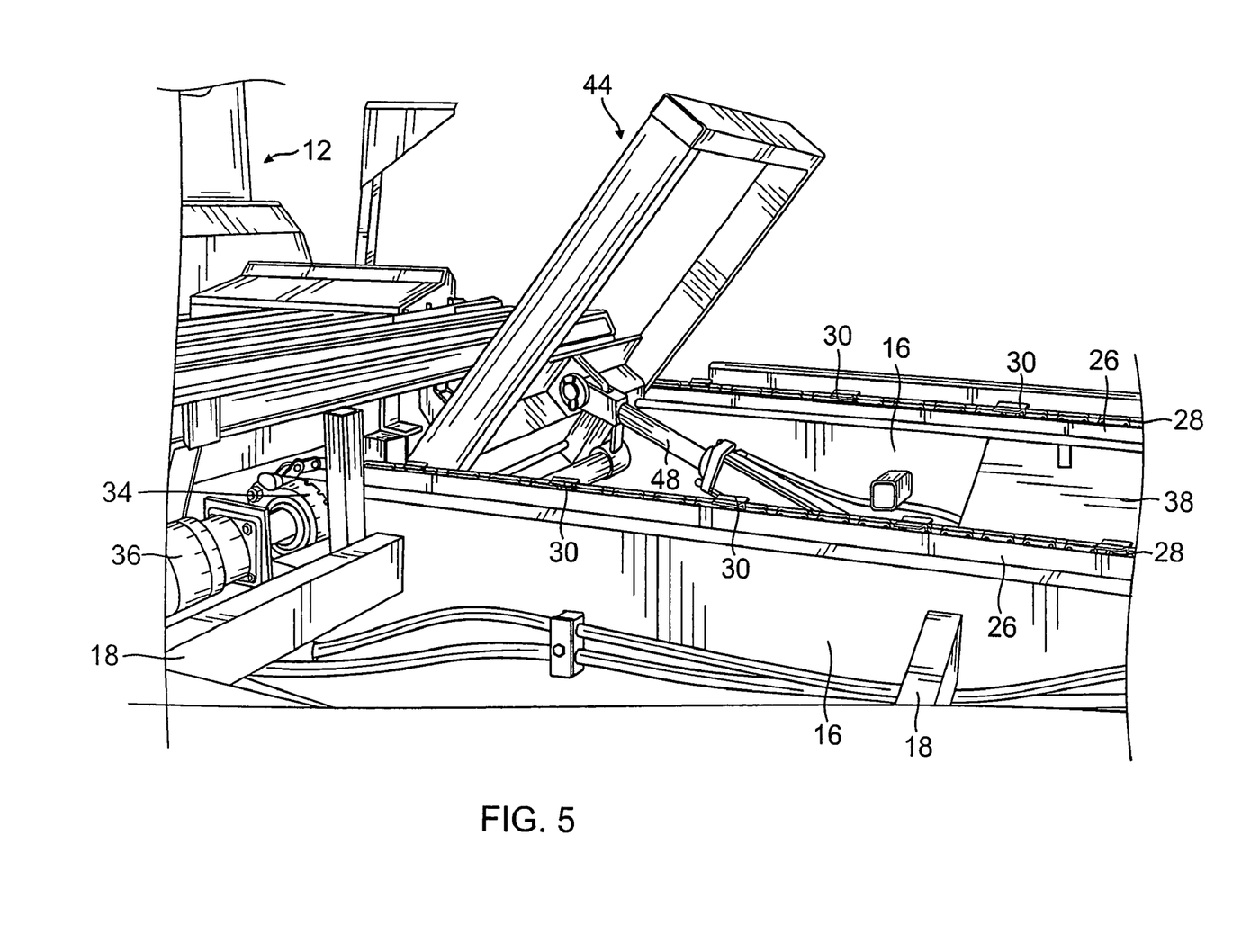
FIG. 5 is a detail view of a tipping frame used with the present invention.

The truck 12 is provided with a sub frame assembly 20, as shown in FIG. 4, which is bolted to the truck 12. The beams 16 are pivotally mounted to the sub frame 20 with pins 24 as shown in FIG. 2. As shown in FIG. 5, a "U" channel member 26 is welded to the top of each of the beams 16. An endless conveyor chain 28 rests in channel 26 and is returned through the interior of beam 16. The conveyor chains 28 include protuberances 30 for frictionally engaging hay bales resting on frame 11. The two conveyor chains 28 are fitted around idler sprockets 32 as shown in FIG. 3 and further around drive sprockets 34 as shown in FIG. 5. The drive sprockets are driven by a hydraulic drive motor 36.

A plate bed 38 extends between the channels 26 and is supported by underlying support members (not shown) connected between the beams 16. The frame 11 is rotated with respect to the sub frame 20 with a conventional hydraulic hoist 40. In a preferred embodiment the hoist 40 is a Crysteel 4000 Scissor Hoist. The hoist 40 has one end connected to the sub frame 20 as shown in FIG. 4 and has the other end connected to the beams 16. The hydraulic hoist 40 is actuated with a hydraulic cylinder 42 in a conventional manner.

Adjacent to the ends of the beams 16 closest to the cab of the truck 12 is mounted a tipping frame 44 as shown in FIG. 5. The tipping frame 44 has one side of the frame rotatably mounted to the beams 16. The tipping frame 44 is tilted upwardly and forwardly with respect to the beams 16 with a hydraulic cylinder 48 as shown in FIG. 5.

Figure 6:
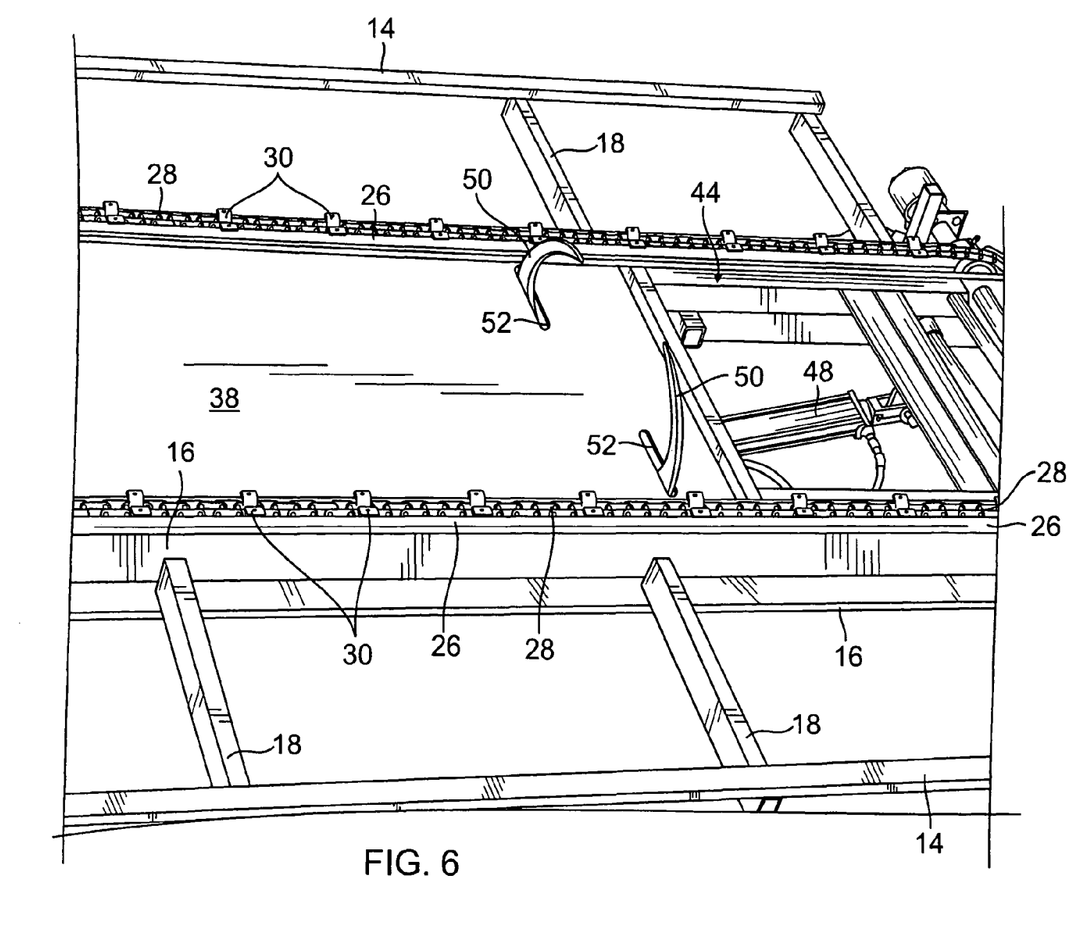
FIG. 6 is a detail view of an upper end of the support frame shown in FIG. 2.
Figure 7:
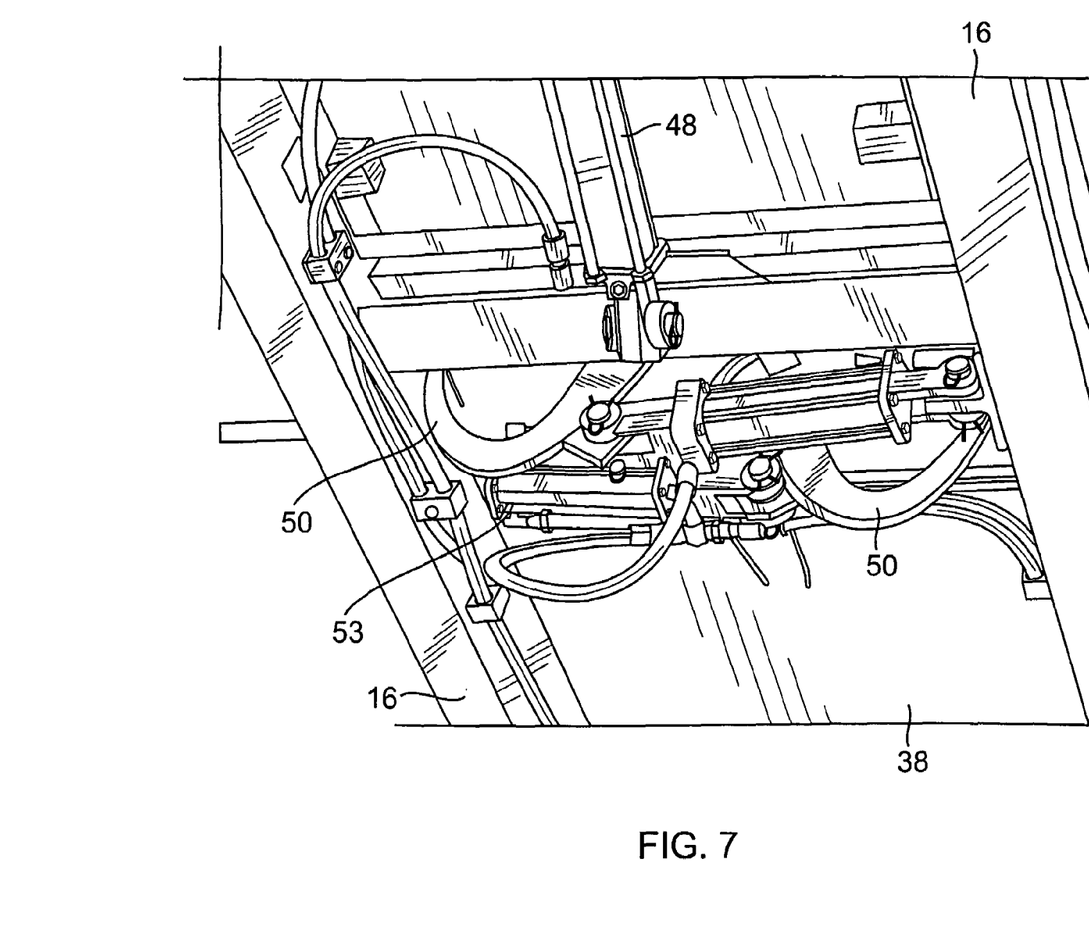
FIG. 7 is a bottom view of the detail view shown in FIG. 6.

Adjacent to the tipping frame 44, a pair of grapple teeth 50 are mounted to extend through slots 52 provided in the bed 38 as shown in FIG. 6. With reference to FIG. 7 which shows the underside of the bed 38, the grapple teeth 50 are rotatably mounted at one end thereof to support members running between beams 16. Hydraulic cylinders 52 are used to rotate the teeth 50 from a collapsed position as shown in FIG. 7 to an extended position as shown in FIG. 6.

As shown in FIG. 1, a tubular beam 54 is secured to an end of beams 16 and extends laterally across the frame 11. At each end of the tubular beam 54, a squeeze arm 56 is pivotally mounted with a pin 58. The squeeze arms 56 are provided with internally extending spikes 60. The squeeze arms 56 are moved inwardly or outwardly with hydraulic cylinders 62.

Figure 8:
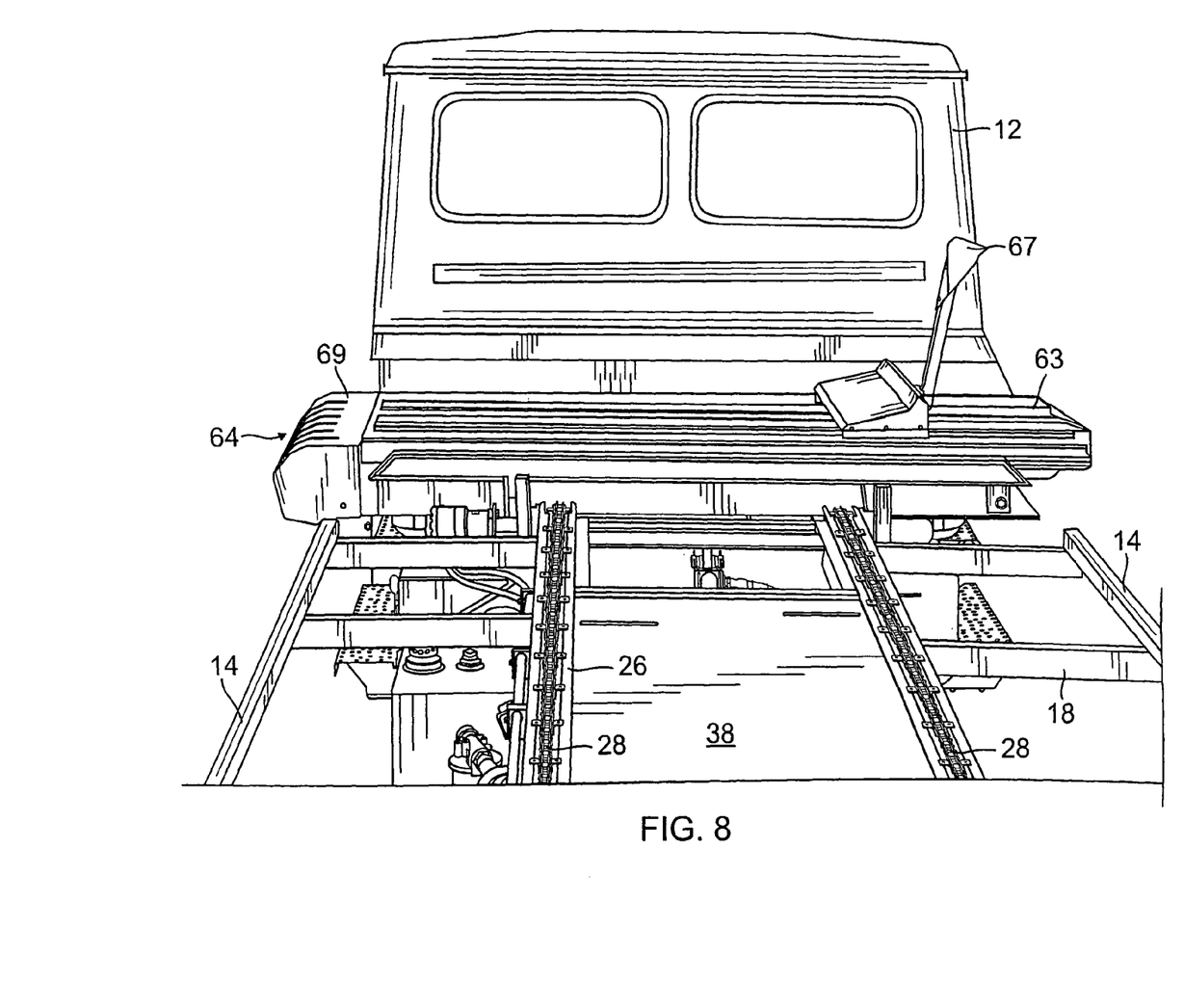
FIG. 8 is a detail view of a square bale flaker apparatus used with the present invention.
Figure 15:
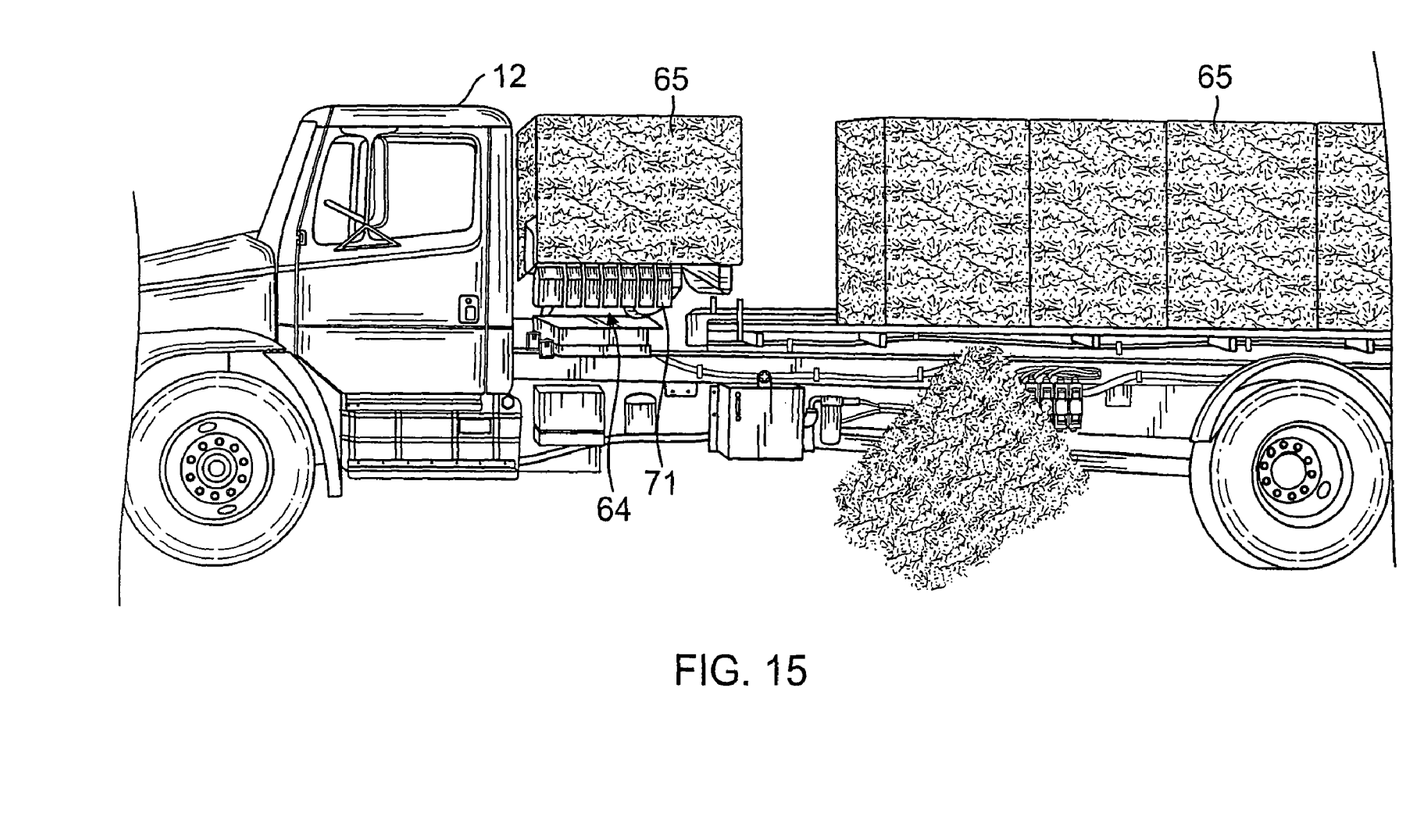
FIG. 15 is a perspective view of the present invention showing a square bale being flaked for feeding.

As shown in FIG. 8, a conventional square bale flaker 64 is mounted on the sub frame 20 of the truck 12 and is positioned forwardly and adjacent to the tilt frame 44. In a preferred embodiment, the bale flaker 64 is a Hydra FLKR manufactured by Triple C. The square bale flaker 64 is hydraulically operated with a conventional mechanism not shown. As shown in FIG. 8, the conventional square bale flaker 64 includes a bed 63 for receiving a square bale 65. Further, a controllable pusher assembly 67 pushes a square bale laterally toward a controllable flaking apparatus 69 located on a lateral edge of the frame 11. The flaking apparatus 69, when actuated, moves a plurality of tines (not shown) which extend upwardly and away from the frame 11 through slots 71. If a square bale is positioned over the flaking apparatus 69, a portion of the square bale is flaked away as shown in FIG. 15.

Figure 14:
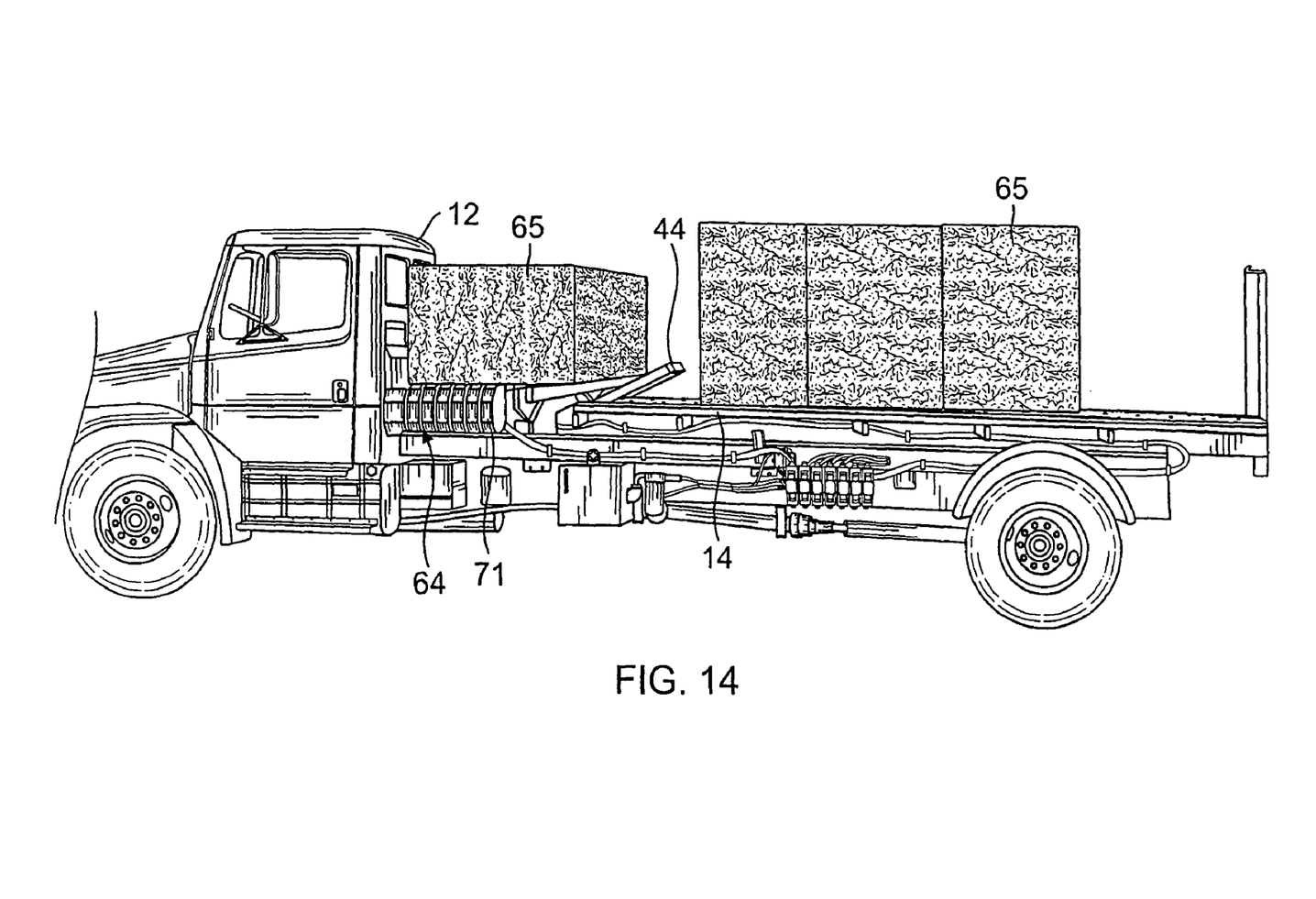
FIG. 14 is a perspective view of the present invention where a square bale is loaded onto a square bale flaker used with the present invention.

The tilt frame 44 is used for tipping a bale onto the bed 63 of square bale flaker 64 as shown in FIG. 14.

Figure 9:
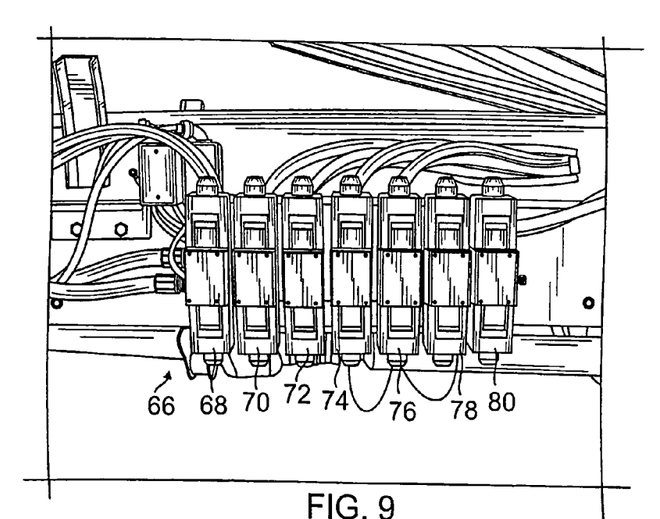
FIG. 9 is a detail view of a bank of solenoid valves used with the present invention.
Figure 10:
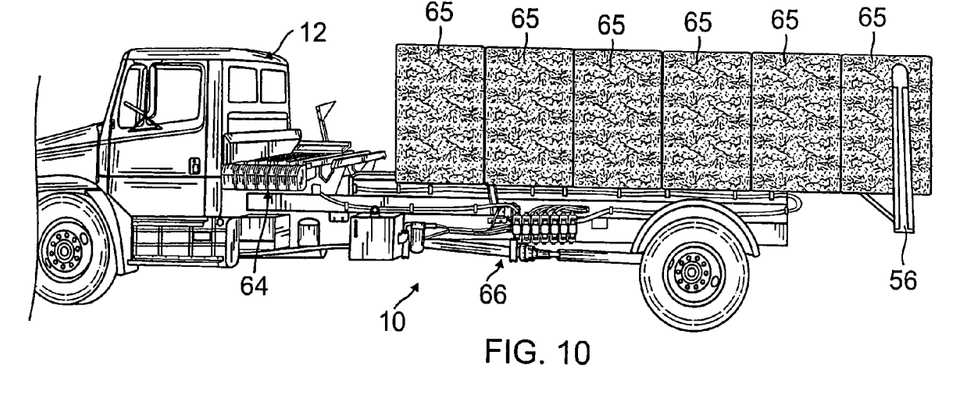
FIG. 10 is an elevational view of the invention shown in FIG. 1 with square bales loaded on the support frame.

A bank of electrically operated solenoids 66 controlling the operation of the hydraulic cylinders is mounted to the sub frame 20 as shown in FIG. 10. A detail view of the bank of solenoids 66 is shown in FIG. 9. This bank of solenoids 66 includes a solenoid 68 for controlling the square bale flaker 64. A solenoid 70 controls the hydraulic cylinder 48 for moving the tilt frame 44. The solenoid 72 controls the two hydraulic cylinders 52 for operating the grapple teeth 50. The solenoid 74 controls the two hydraulic cylinder 62 for operating the squeeze arms 56. The solenoid 76 operates the hydraulic cylinder 42 for operating the hoist 40. The solenoid 78 is used for controlling the operation of the hydraulic motor 36 for operating the conveyor chain 28. The solenoid 80 is a pressure (up) valve for maintaining an open center of the hydraulic system. This valve will close when another switch is activated to cause pressure in the system. Otherwise the valve is opened and there is free flow of fluid in the hydraulic system.

Figure 11:
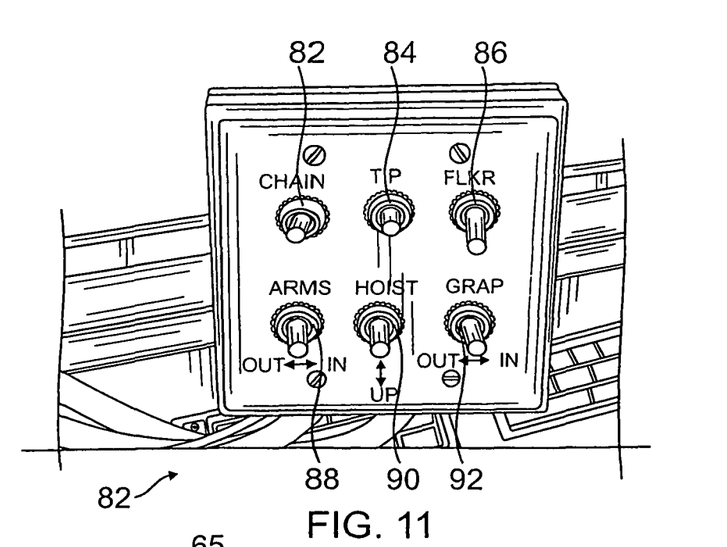
FIG. 11 is a detail view of an electrical control panel used with the present invention.

An electrical switch panel 82, shown in FIG. 11, is mounted in the cab of the truck for use by the operator and is used for controlling the solenoids in the solenoid bank 66. The switch 82 operates the solenoid 78 to control movement of the conveyor chain 28. The switch 84 controls the solenoid 70 for operating the tipping frame 44. The switch 86 controls the solenoid 68 for controlling the square bale flaker 64. The switch 88 controls the solenoid 74 for controlling the squeeze arms 56. Movement of the switch 88 in one direction moves the squeeze arms inwardly. Moving the switch 88 in the other direction moves the squeeze arms outwardly. The switch 90 operates the solenoid 76 for controlling the hoist 40. Movement of the switch upwardly moves the hoist 40 to an extended position and moving this switch downwardly moves the hoist 40 to a collapsed position. The switch 92 controls the solenoid 72 and is used for moving the grapple teeth 50. When the switch is moved in one direction the grapple teeth 50 are moved inwardly. When the switch is moved to the opposite position, the grapple teeth 50 are moved outwardly.

Figure 12:
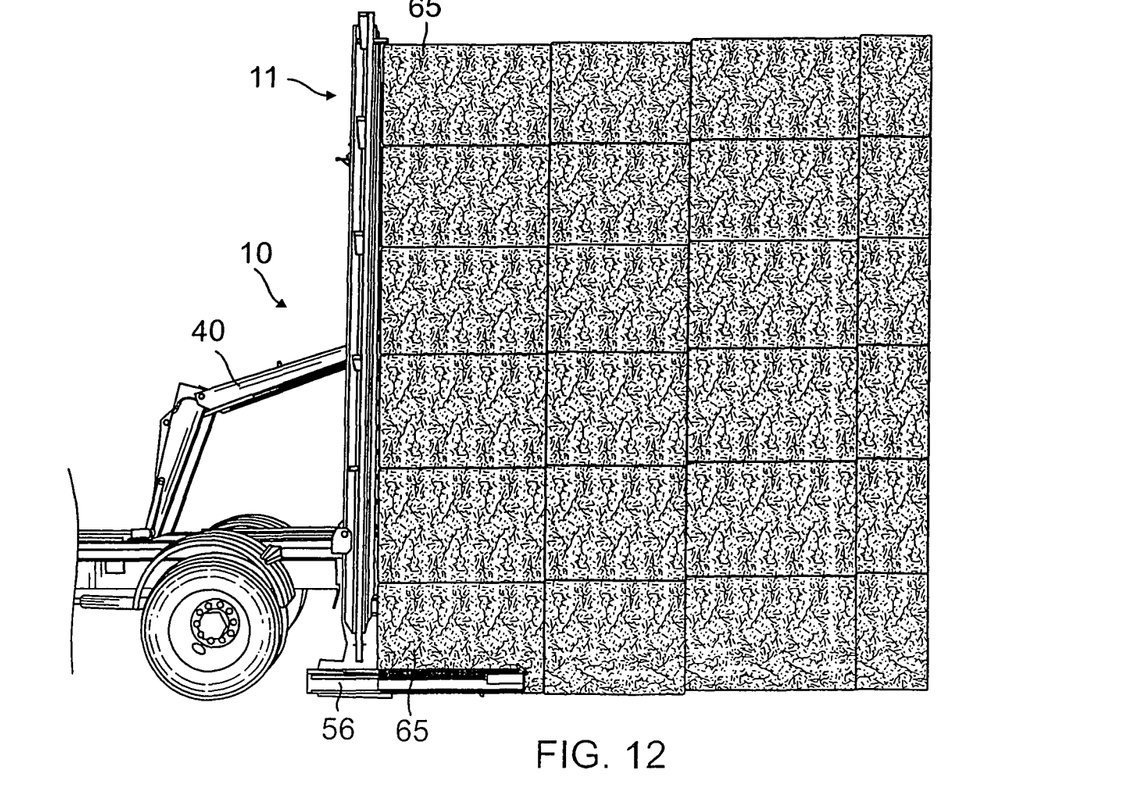
FIG. 12 is a perspective view of the present invention being used for loading a stack of square bales.
Figure 13:
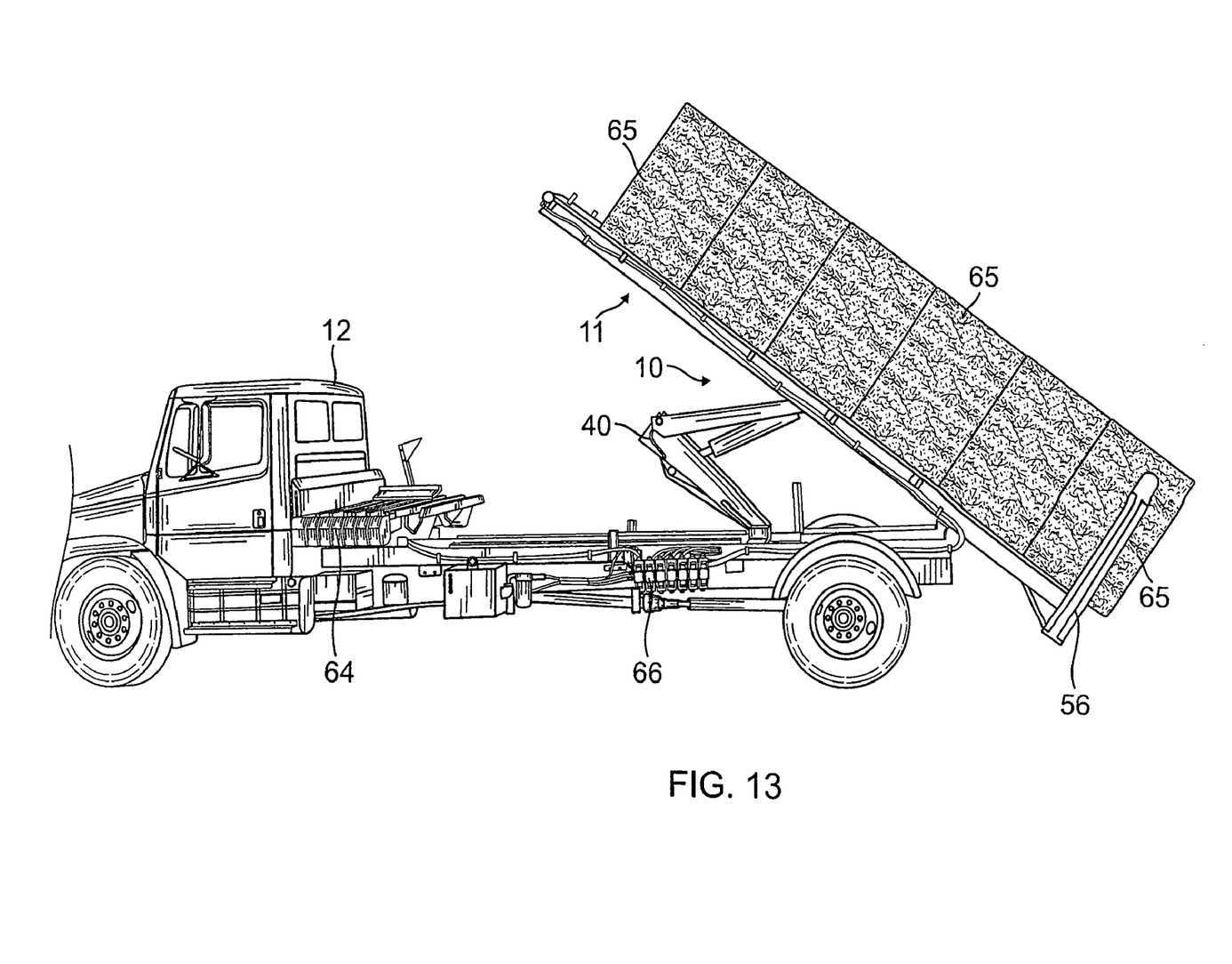
FIG. 13 is a perspective view of the present invention lowering a stack of square bales onto a truck.

The operation of the square bale flaker and feeder 10 is shown in FIGS. 10 and 12-15. When the invention 10 is to be used, the switch 90 is operated to actuate the hoist 40 for moving the loading frame to an extended position as shown in FIGS. 2 and 12. The switch 88 is then used for moving the squeeze arms 56 outwardly. The truck 12 is then driven rearedly to a position where support frame 11 rests against a stack of square bales as shown in FIG. 12. The switch 88 is then reversed in position to move the arms 56 inwardly whereby the spikes 60 are driven into the lower bale in the stack of bales. Next, the grapple teeth 50 are actuated with switch 92 to rotate the grapple teeth outwardly for securing the top bale of the stack to the support frame 11. Next, the hoist switch 90 is used to collapse the hoist 40 as shown in FIG. 13 to a position as shown in FIG. 10.

The truck 12 is then driven to the place where feeding is to begin. The grapple teeth 50 are then retracted with the switch 92 and the conveyor chain 28 activated with switch 82 moving the bales forwardly until the forward most bale is positioned over the tipping frame 44. Next the conveyor chain 82 is deactivated with switch 82. The switch 84 is activated to tilt the tipping frame 44 thereby tipping one of the bales onto the square bale flaker 64 as shown in FIG. 14. Using a tipping frame 44 to tip a bale onto the square bale flaker 64 has particular advantage when trying to feed a stack of bales with the bale at the top of the stack having a frozen top surface. When the bales are loaded on the bed of the truck 12 the frozen surface faces the cab of the truck 12. When this bale is tipped, the frozen surface is positioned to lie on the flaker 64 making the flaking process easier to accomplish.

When it is desired to feed the hay, the square bale flaker 44 is operated with switch 86 to flake off portions of the bale as shown in FIG. 15.

While the fundamental novel features of the invention have been shown and described, it should be understood that various substitutions, modifications and variations may be made by those skilled in the arts, without departing from the spirit or scope of the invention. Accordingly, all such modifications or variations are included in the scope of the invention as defined by the following claims:

I claim

1. Apparatus for loading and feeding square hay bales comprising:

a transport vehicle having a sub frame assembly extending in a longitudinal direction and having a forward and aft end relative to the direction of forward travel of the transport vehicle;

an elongate support frame connected to the sub frame assembly and extending in the longitudinal direction;

the support frame having an upper surface and sized to receive multiple bales on the upper surface positioned in side by side relation;

a longitudinally extending endless chain mounted on the upper surface of the support frame for selectively moving bales resting on the support frame longitudinally on the support frame toward the forward end;

a square bale flaker means mounted to the sub frame assembly at the forward end thereof;

the square bale flaker means including:

a bed positioned to transverse the support frame in a lateral direction and aligned with the upper surface of the support frame;

a flaking apparatus positioned at an outer end of the bed adjacent a lateral edge of the support frame; and a pusher assembly for pushing a square bale located on the bed toward the flaking apparatus; and a tipping means for selectively tipping a bale from the upper surface of the support frame onto the bed of the square bale flaker means;

the tipping means including:

a rotatable tipping frame embedded in the support frame and having an upper surface aligned with the upper surface of the support frame;

the tipping means having one side of the tipping frame rotatably mounted to an axle mounted to the support frame at a position below the upper surface of the support frame and at a forward end of the support frame immediately before the bed of the square bale flaker means; and a controllable hydraulic cylinder mounted to the tipping frame at a position spaced apart from the axle for selectively rotating the tipping frame about the axle upwardly and forwardly toward the bed of the square bale flaker.

2. The apparatus according to claim 1 wherein the support frame is hingedly connected to the sub frame assembly and further including a hoist means for tilting the support frame from a horizontal position to a vertical position and control means for activating the hoist.

3. The apparatus according to claim 2 further including:

a pair of squeeze arms pivotally mounted to the support frame at the aft end thereof on opposite lateral sides for pivotal movement in a lateral direction;

a control means for simultaneously moving the squeeze arms in an outward direction and in an opposite inward direction for clasping a bale;

grapple teeth mounted to the support frame at the forward end thereof for movement from a retracted position to an extended position; and a control means for selectively moving the grapple teeth from a retracted position to an extended position.

* * * * *